(12) United States Patent
Mizobe et al.

(10) Patent No.: US 8,210,975 B2
(45) Date of Patent: Jul. 3, 2012

(54) AUTOMATIC TRANSMISSION

(75) Inventors: Tatsutoshi Mizobe, Hiroshima (JP); Junichi Doi, Hiroshima (JP); Shinya Kamada, Kure (JP); Keiichiro Sueshige, Hiroshima (JP); Akihiro Mitani, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 980 days.

(21) Appl. No.: 12/199,620

(22) Filed: Aug. 27, 2008

(65) Prior Publication Data

US 2009/0088281 A1    Apr. 2, 2009

(30) Foreign Application Priority Data

Sep. 28, 2007  (JP) ................... 2007-254070
Sep. 28, 2007  (JP) ................... 2007-254071

(51) Int. Cl.
*F16H 47/08*   (2006.01)
*F16H 57/02*   (2012.01)

(52) U.S. Cl. ........................ 475/61; 74/606 R (58) Field of Classification Search .............. 475/61, 475/120
See application file for complete search history.

(56) References Cited

U.S. PATENT DOCUMENTS

| | | | |
|---|---|---|---|
| 4,858,500 A * | 8/1989 | Harada et al. .................. | 477/62 |
| 6,205,887 B1 | 3/2001 | Barnreiter et al. | |
| 6,488,601 B1 | 12/2002 | Sommer et al. | |
| 6,530,856 B1 | 3/2003 | Kakiage | |
| 2005/0178238 A1 | 8/2005 | Korner et al. | |
| 2007/0078036 A1 | 4/2007 | Morise | |
| 2008/0188339 A1 | 8/2008 | Bader et al. | |

FOREIGN PATENT DOCUMENTS

| | | |
|---|---|---|
| DE | 19745537 | 4/1999 |
| DE | 102005021862 | 11/2006 |
| DE | 102005028122 | 12/2006 |
| DE | 19710931 | 10/2007 |
| EP | 1256747 | 11/2002 |
| JP | 06159491 | 6/1994 |
| JP | 07098049 | 4/1995 |
| JP | 11336881 | 12/1999 |
| JP | 2002012097 | 1/2002 |
| JP | 2002327832 | 11/2002 |
| JP | 2003021227 | 1/2003 |

OTHER PUBLICATIONS

ISA European Patent Office, Search Report of EP 08 01 5635, Jul. 23, 2009, Netherlands, 4 pages.

* cited by examiner

*Primary Examiner* — Edwin A Young
(74) *Attorney, Agent, or Firm* — Alleman Hall McCoy Russell & Tuttle LLP (57) ABSTRACT

An automatic transmission is provided. One embodiment of the automatic transmission may include a valve body including control valves for hydraulically controlling a friction engaging element provided within said transmission. The automatic transmission may further include an electric control unit located on said valve body for controlling gear shifting of said automatic transmission. The automatic transmission may further include a transmission case having a peripheral wall for at least partially enclosing a gear shift mechanism and an outer wall provided adjacent to said peripheral wall, wherein said electric control unit is located within a containing space surrounded by said peripheral wall, said outer wall and said valve body.

12 Claims, 7 Drawing Sheets

FIG. 1

|  | 1st Clutch (40) | 2nd Clutch (50) | 1st Brake (60) | 2nd Brake (70) | 3rd Brake (80) |
|---|---|---|---|---|---|
| 1st. Gear | O |  | (O) |  |  |
| 2nd. Gear | O |  |  | O |  |
| 3rd. Gear | O |  |  |  | O |
| 4th. Gear | O | O |  |  |  |
| 5th. Gear |  | O |  |  | O |
| 6th. Gear |  | O |  | O |  |
| Reverse Gear |  |  | O |  | O |

AUTOMATIC TRANSMISSION

TECHNICAL FIELD

The present description relates to automatic transmissions. More particularly, the description pertains to automatic transmissions having a transmission case in which an electric control unit is located while avoiding thermal damage to the electric control unit from high temperature hydraulic oil.

BACKGROUND AND SUMMARY

Some automatic transmissions installed in automobiles are configured to change a power-flow path by changing an engagement state of plural friction elements to select a certain gear from among plural gears having different gear ratios.

In some automatic transmissions, a control valve unit incorporating plural electromagnetic control units for changing an oil passage in a hydraulic system for engaging or disengaging the friction elements is integrally located on a lower side of a gear shift mechanism.

In recent years, the number of selectable gears in automatic transmissions has been increased to improve travelling performance and/or fuel-efficiency of an automobile.

In some conventional automatic transmissions, an electric control unit for controlling the control valve unit is located outside of a transmission case.

But this design has a disadvantage of high manufacturing cost in the case where the automatic transmission has a relatively high number of selectable gears, since it requires many lengthy harnesses for connecting the electric control unit to the large number of control valves corresponding to the high number of selectable gears.

One technology for addressing this disadvantage has been developed, in the form of an automatic transmission for an automobile including a harness integrated insulating sheet and an electric control unit located on the upper side of a valve body of a control valve unit immediately beneath a gear shift mechanism. The reference further discloses a plastic protective cover that covers above the electric control unit, and a rotation sensor, oil temperature sensor and oil pressure sensor that are provided in the harness integrated insulating sheet at an outside of the plastic protective cover. One example of such an automatic transmission is described by U.S. Pat. No. 6,530,856.

However, the inventor herein has recognized a disadvantage with such approaches. Specifically, although the automatic transmission described in above reference can shorten the length of harnesses for connecting an electric control unit with electromagnetic control valves, by locating the electric control unit on the upper side of a valve body of a control valve unit immediately beneath a gear shift mechanism via a harness integrated insulating sheet, the electric control unit can experience thermal damage from high temperature oil for cooling the gear shift mechanism dispersed from the gear shift mechanism, which usually contacts the upper surface of the plastic protective cover, thereby decreasing the durability of the electric control unit.

A first aspect of the present invention includes an automatic transmission including a valve body including control valves for hydraulically controlling a friction engaging element provided within said transmission. The automatic transmission may further include an electric control unit located on said valve body for controlling gear shifting of said automatic transmission. The automatic transmission may further include a transmission case having a peripheral wall for at least partially enclosing a gear shift mechanism and an outer wall provided adjacent to said peripheral wall, wherein said electric control unit is located within a containing space surrounded by said peripheral wall, said outer wall and said valve body.

This automatic transmission overcomes at least some of the disadvantages of above reference.

Since an electric control unit is located within a containing space formed by a peripheral wall, an outer wall provided adjacent to the peripheral wall and a valve body, the electric control unit can be located offset forwardly from immediately beneath the gear shift mechanism by utilizing a dead space formed inside of the outer wall of the transmission case. Accordingly, the electric unit can be located in a position where it does not experience heat damage from high temperature oil dispersed from the gear shift mechanism while the electric unit is located inside of the transmission case, thereby, preventing durability decreasing of the electric control unit.

A second aspect of the present invention includes an automatic transmission including a valve body including control valves for hydraulically controlling a friction engaging element provided within said transmission, and an electric control unit located on said valve body for controlling gear shifting of said automatic transmission. The automatic transmission may further include a transmission case having a peripheral wall for at least partially enclosing a gear shift mechanism, an outer wall provided adjacent to said peripheral wall, and a containing space surrounded by said peripheral wall, said outer wall and said valve body such that a shape of said containing space is convex upward, wherein said electric control unit is located within said containing space.

This automatic transmission also overcomes at least some of the disadvantages of above reference.

In an example embodiment, the automatic transmission may further comprise a primary shaft coaxially positioned relative to an engine output shaft and provided in said gear shift mechanism, a secondary shaft extending parallel to and located above and behind said primary shaft, and a differential axis extending parallel to and located below and behind said primary shaft, wherein said valve body is located under said gear shift mechanism, and said containing space is positioned on a forward side of said gear shift mechanism.

In another example embodiment, the automatic transmission further comprises a rotation sensor for detecting a rotation speed of a designated rotating element of said gear shift mechanism, wherein said rotation sensor is integrated with and extending diagonally from said electric control unit.

In another example embodiment, the automatic transmission further comprises a torque convertor, wherein said rotation sensor is spatially positioned intermediate said electric control unit and said torque convertor.

In another example embodiment, the automatic transmission further comprises a manual valve provided in said valve body and moving in conjunction with a shift range changing operation via a shift lever, and a position detecting sensor for detecting a position of said manual valve, wherein said position detecting sensor is integrated with said electric control unit.

As a non limiting example, the manual valve is located parallel with said primary shaft and is configured to move in an axial direction of the primary shaft.

In one example embodiment, the valve body is one of a plurality of valve bodies, and the automatic transmission further comprises a control valve unit including the plurality of valve bodies stacked in an up and down direction. Further, said manual valve is provided in a one of the valve bodies located on a top portion of said control valve unit, and said electric control unit is located on an upper side of said valve body located on the top portion of said control valve unit.

A third aspect of the present invention includes an automatic transmission including a transmission case having a peripheral wall for at least partially enclosing a gear shift mechanism and an outer wall provided adjacent to said peripheral wall. The peripheral wall and outer wall of the transmission case are formed to at least partially define, with a valve body associated with the transmission case, a containing space sized to contain an electric control unit located on the valve body.

In this way, at least some of the disadvantages of the related reference described above are overcome.

DETAILED DESCRIPTION

Hereafter, the best mode to implement the present invention will be explained based on the accompanying drawings.

Figure 1:
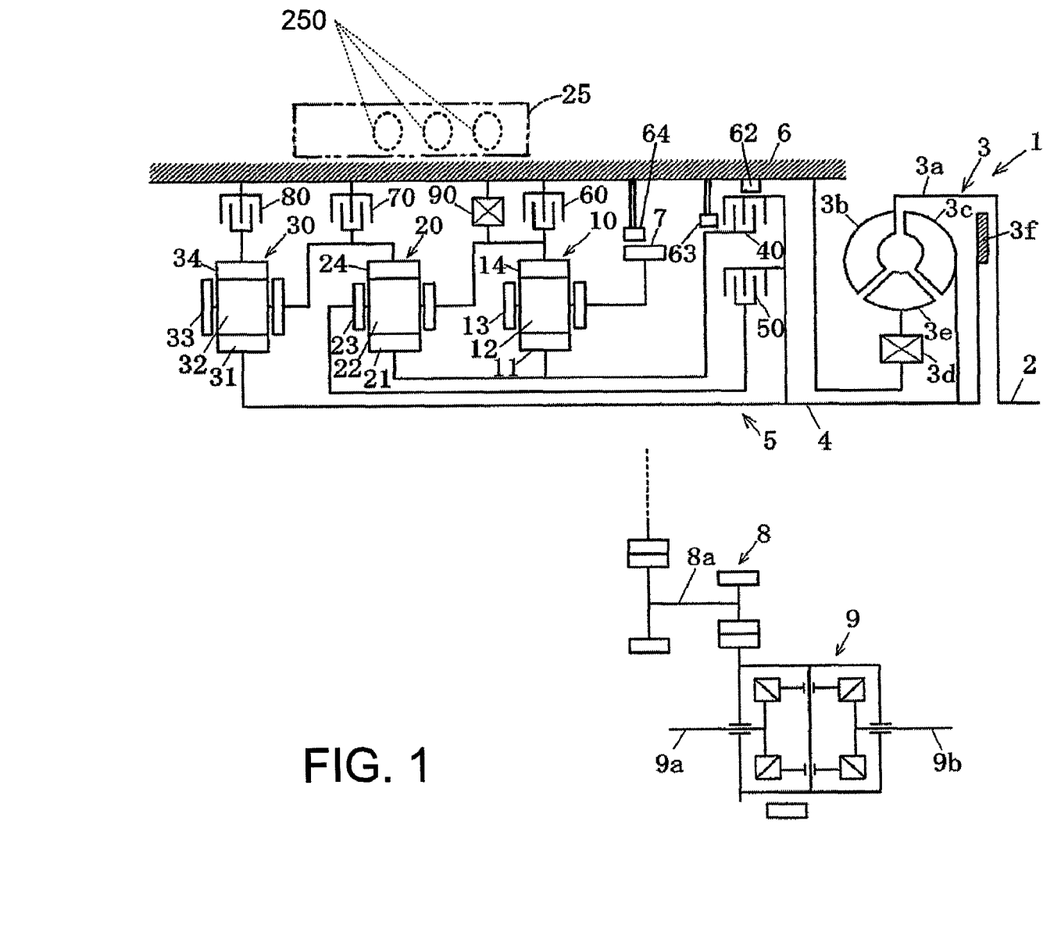
FIG. 1 is a schematic diagram showing an automatic transmission according to an embodiment of the present invention.

FIG. 1 is a schematic diagram showing a configuration of an automatic transmission 1 according to an embodiment of the present invention. In this embodiment, the automatic transmission 1 is applied to an automobile in which an engine is side-mounted, such as a front-engine front-wheel drive (FF) vehicle. The automatic transmission 1 primarily includes a torque converter 3 attached to an engine output shaft 2, and a gear-shift mechanism 5 into which an output rotation of the torque converter 3 is inputted via an input shaft 4. The gear-shift mechanism 5 is accommodated inside a transmission case 6 in a state where it is arranged on the axial center of the input shaft 4.

The output rotation of the gear-shift mechanism 5 is transmitted to a differential device 9 via a counter-drive mechanism 8 from an output gear 7 that is similarly arranged on the axial center of the input shaft 4 at an intermediate position of the input shaft 4, and thereby axles 9a and 9b on the left and right sides are driven.

The torque converter 3 includes a case 3a coupled with the engine output shaft 2, a pump 3b fixed inside the case 3a, and a turbine 3c oppositely arranged to the pump 3b and driven by the pump 3b through operating oil. The torque converter 3 also includes a stator 3e that is arranged between the pump 3b and the turbine 3c, and is supported by the transmission case 6 via a one-way clutch 3d to increase engine torque, and a lock-up clutch 3f that is provided between the case 3a and the turbine 3c, and directly connects the engine output shaft 2 and the turbine 3c via the case 3a. The rotation of the turbine 3c is transmitted to the gear-shift mechanism 5 via the input shaft 4.

The gear-shift mechanism 5 includes first, second, and third planetary-gear sets 10, 20, and 30, respectively (hereinafter, simply referred to as "first, second, and third gear sets"). These are arranged inside the transmission case 6 on the opposite side of the torque converter 3 from the output gear 7, in this order from the torque converter 3.

As friction-engaging elements constituting the gear-shift mechanism 5, a first clutch 40 and a second clutch 50 are arranged on the torque converter side from the output gear 7. On the opposite side of the torque converter 3 from the output gear 7, a first brake 60, a second brake 70, and a third brake 80 are arranged in this order from the torque converter 3. A one-way clutch 90 is arranged in parallel with the first brake 60.

In this embodiment, each of the first, second, and third gear sets 10, 20, and 30 is a single pinion-type planetary-gear set. The gear set includes sun gears 11, 21, and 31, a plurality of pinions 12, 22, and 32 mating with the sun gears 11, 21, and 31, respectively, careers 13, 23, and 33 supporting the pinions 12, 22, and 32, respectively, and ring gears 14, 24, and 34 mating with the pinions 12, 22, and 32, respectively.

The input shaft 4 is coupled with the sun gear 31 of the third gear set 30. The sun gear 11 of the first gear set 10 and the sun gear 21 of the second gear set 20, the ring gear 14 of the first gear set 10 and the career 23 of the second gear set 20, and the ring gear 24 of the second gear set 20 and the career 33 of the third gear set 30 are mutually coupled. The output gear 7 is coupled with the career 13 of the first gear set 10.

The sun gear 11 of the second gear set 10 and the sun gear 21 of the second gear set 20 are disconnectably coupled with the input shaft 4 via the first clutch 40. The career 23 of the second gear set 20 is disconnectably coupled with the input shaft 4 via the second clutch 50.

The ring gear 14 of the first gear set 10 and the career 23 of the second gear set 20 are disconnectably coupled with the transmission case 6 via the first brake 60 and the one-way clutch 90 that are arranged in parallel to each other. The ring gear 24 of the second gear set 20 and the career 33 of the third gear set 30 are disconnectably coupled with the transmission case 6 via the second brake 70. The ring gear 34 of the third gear set 30 is disconnectably coupled with the transmission case 6 via the third brake 80.

Figure 2:
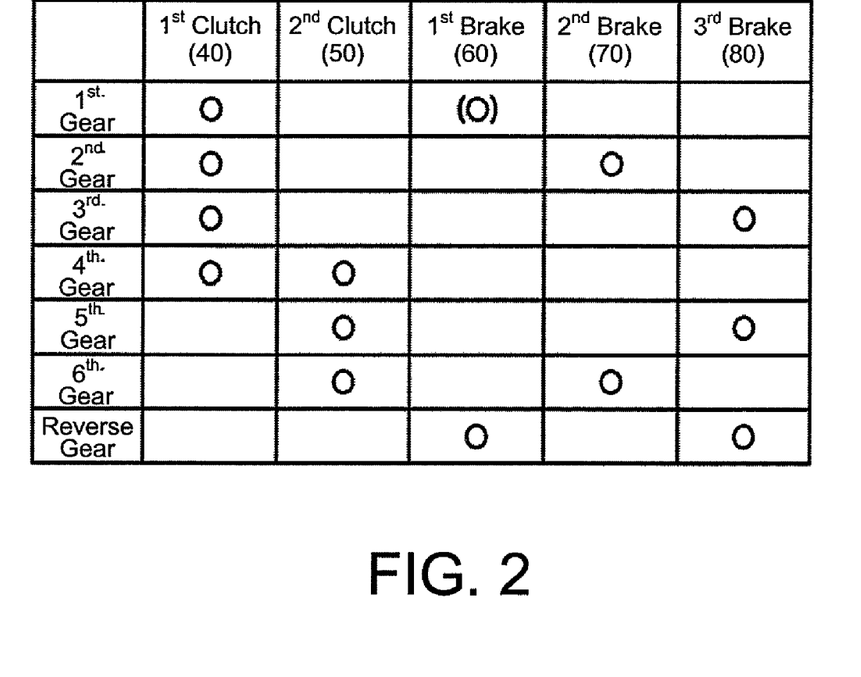
FIG. 2 is a table showing a relationship between coupling combinations of friction-engaging elements and gear positions.

As described above, according to the gear-shift mechanism 5 of this embodiment, six forward gears and a reverse gear can be achieved by the coupling combination of the first and second clutches 40 and 50 and the first, second, and third brakes 60, 70, and 80. The relationship between the combinations and the gear positions is shown in the table of FIG. 2.

Here, the first brake 60 is coupled only in the first gear where engine braking is achieved. In the first gear when the engine braking is not generated, the first gear is formed by locking the one-way clutch 90.

Next, a control device of the automatic transmission 1 will be explained based on FIGS. 3-7. The control device includes an electronic control unit 25 for controlling the gear shift with a control valve mechanism 250, such as a duty solenoid valve or an ON/OFF valve for hydraulically controlling the friction-engaging elements of the gear-shift mechanism 5. Hereinafter, terms "front" and "rear," and "left" and "right" represent front and rear, and left and right of the automobile, respectively, where FIG. 3 is a front view of the automatic transmission 1, and FIG. 4 shows a left side view of the automatic transmission 1.

The automatic transmission 1 includes a primary shaft 26 coaxially provided with the engine, and onto which the gear-shift mechanism 5 is provided. The automatic transmission 1 also includes a secondary shaft 27 that is provided rearward and above the primary shaft 26 and is in parallel with the primary shaft 26. The automatic transmission 1 also includes a differential shaft 28 that is provided rearward and below the primary shaft 26 and is in parallel with the primary shaft 26.

A control-valve unit 41 is disposed in a lower portion of the automatic transmission 1 so as to be located below the gear-shift mechanism 5 (FIG. 1). The control-valve unit 41 includes three valve bodies 42, 43, and 44 that are piled in three layers in the vertical direction, and an oil pan 45. Inside the valve bodies 42, 43, and 44, a manual valve 35 that moves so as to be interlocked with a range-switching operation of a shift lever of the automobile, control valves for hydraulically controlling the friction-engaging elements, a plurality of accumulators, many oil channels, etc. are incorporated.

Figure 3:
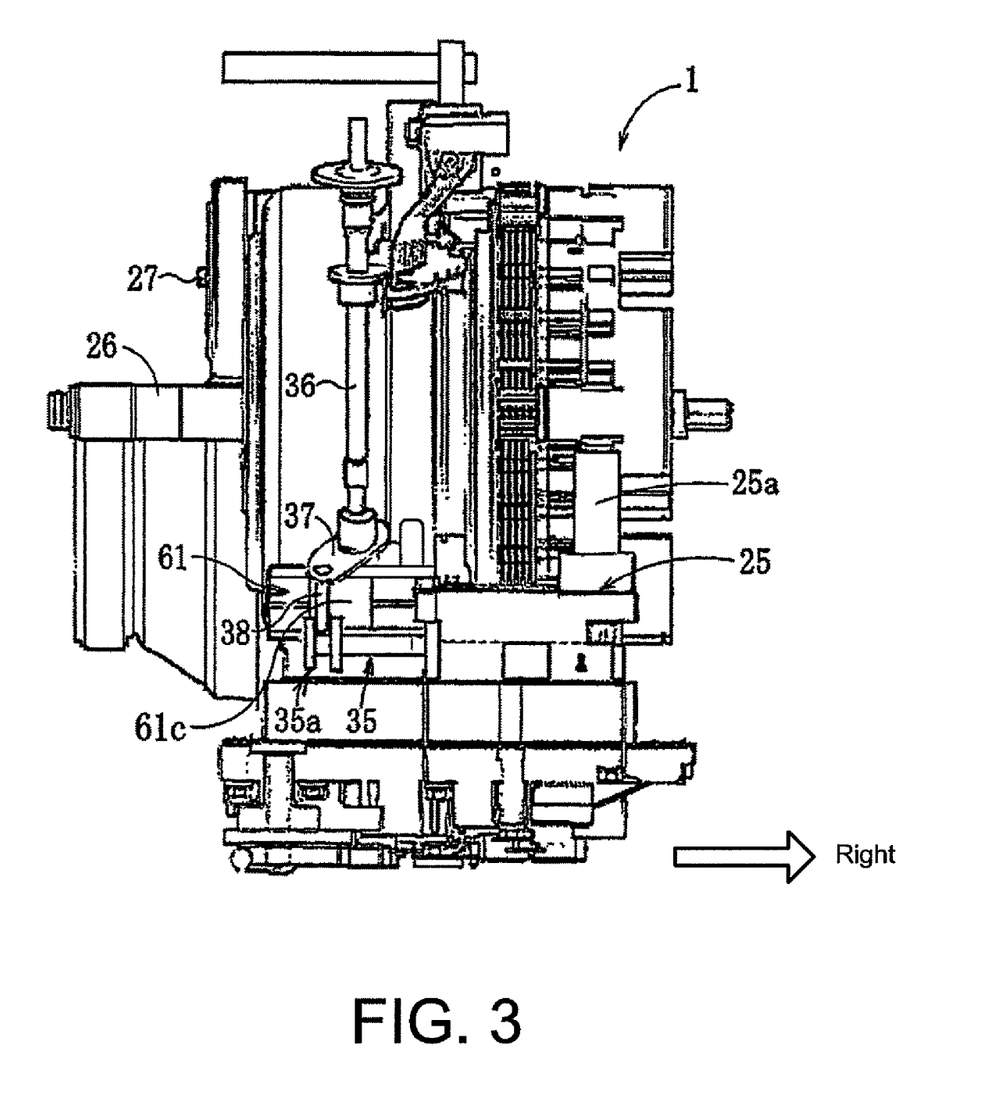
FIG. 3 is a front view of the automatic transmission.
Figure 4:
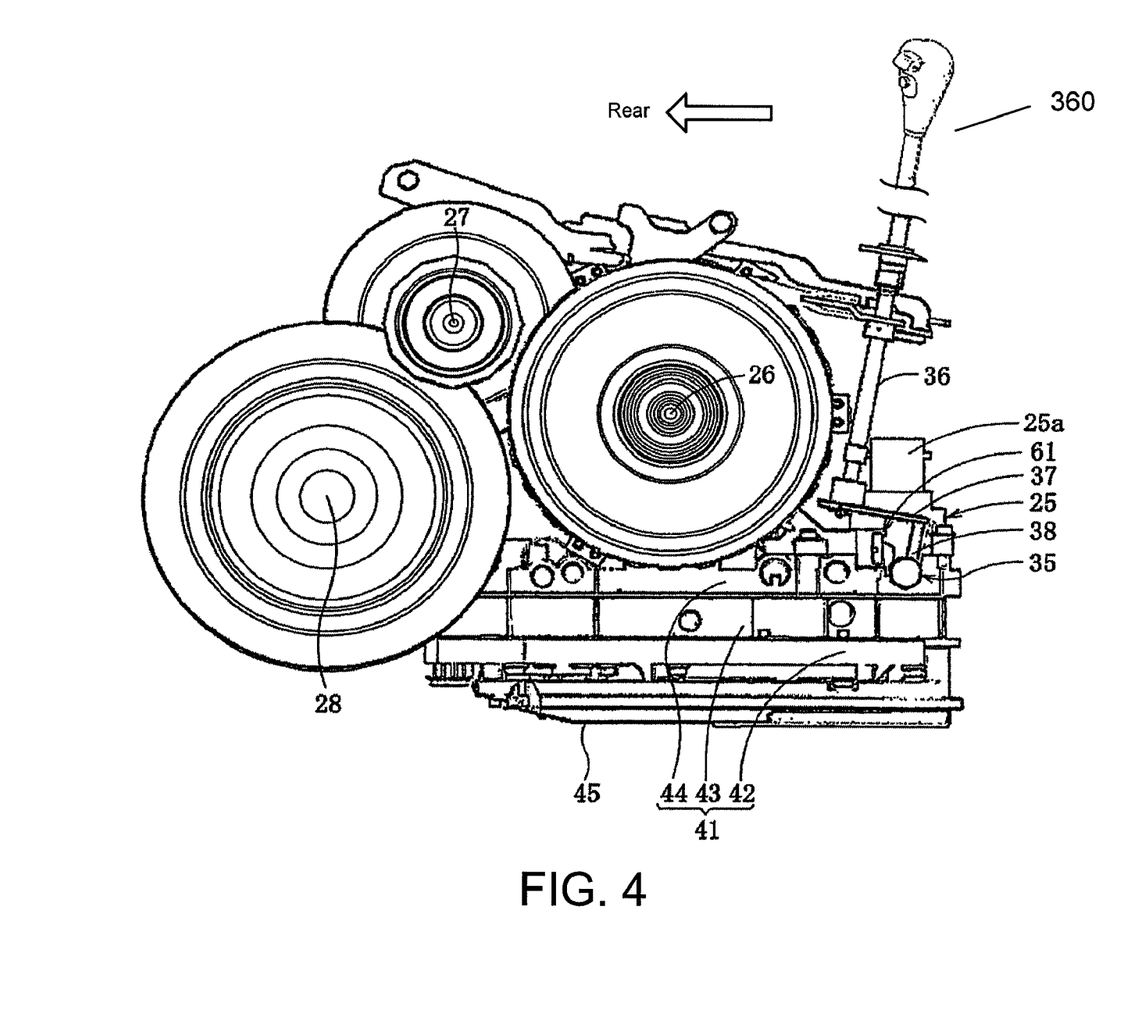
FIG. 4 is a left side view of the automatic transmission.
Figure 5:
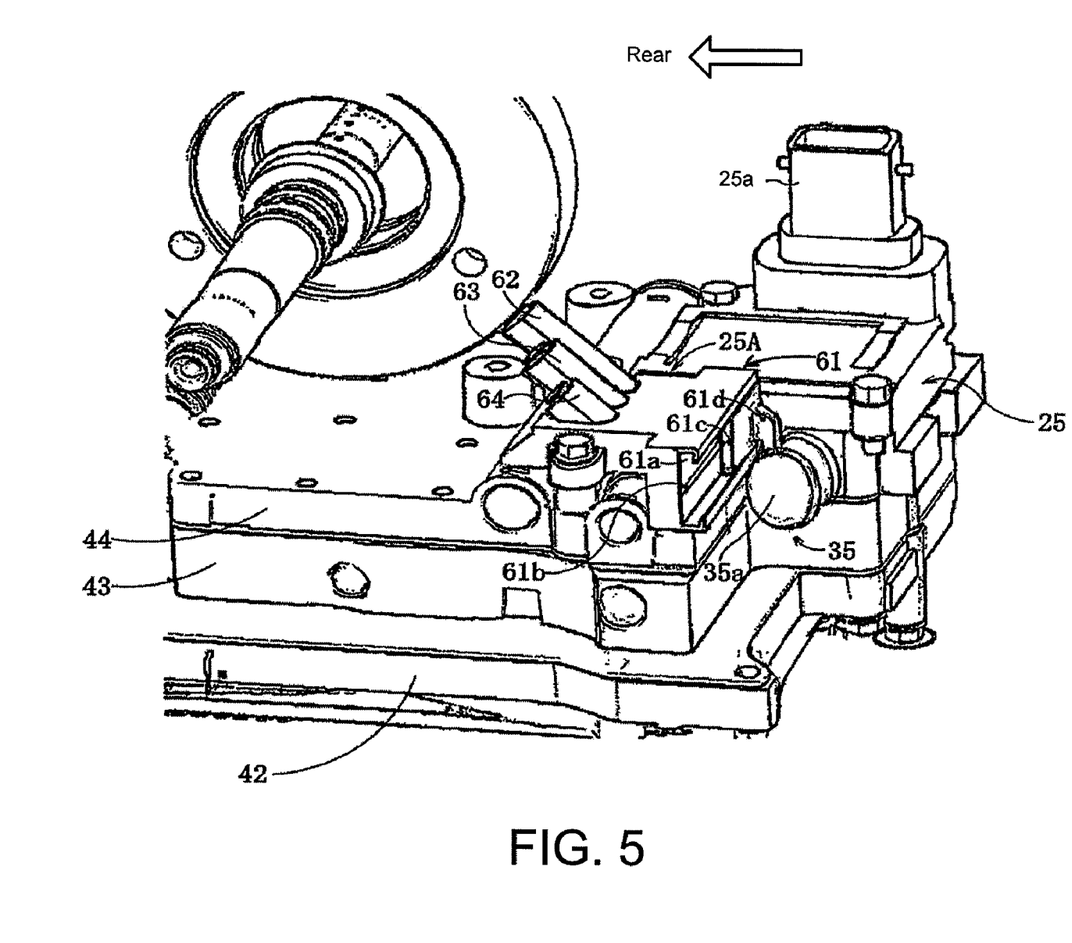
FIG. 5 is a perspective view of an electronic control unit, rotation sensors, and a manual valve, etc.

As shown in FIGS. 3 and 5, the manual valve 35 is disposed in a front-end portion of the highest valve body 44, in parallel with the primary shaft 26 so that it moves in the axial direction. A mechanical operation system including rotational shaft 36, rotary plate 37, and engaging member 38 for interlocking the shift lever with the manual valve 35 is provided to the manual valve 35. The engaging member 38 extends downwardly from the rotary plate 37 at a lower end of the rotational shaft 36 of the operation system. The engaging member 38 engages with a disk member 35a at a tip end of the valve shaft of the manual valve 35. Thus, according to a shift position (P, R, N, or D) selected by a driver who operates the shift lever 360, the manual valve 35 moves in the axial direction via the mechanical operation system.

Figure 6:
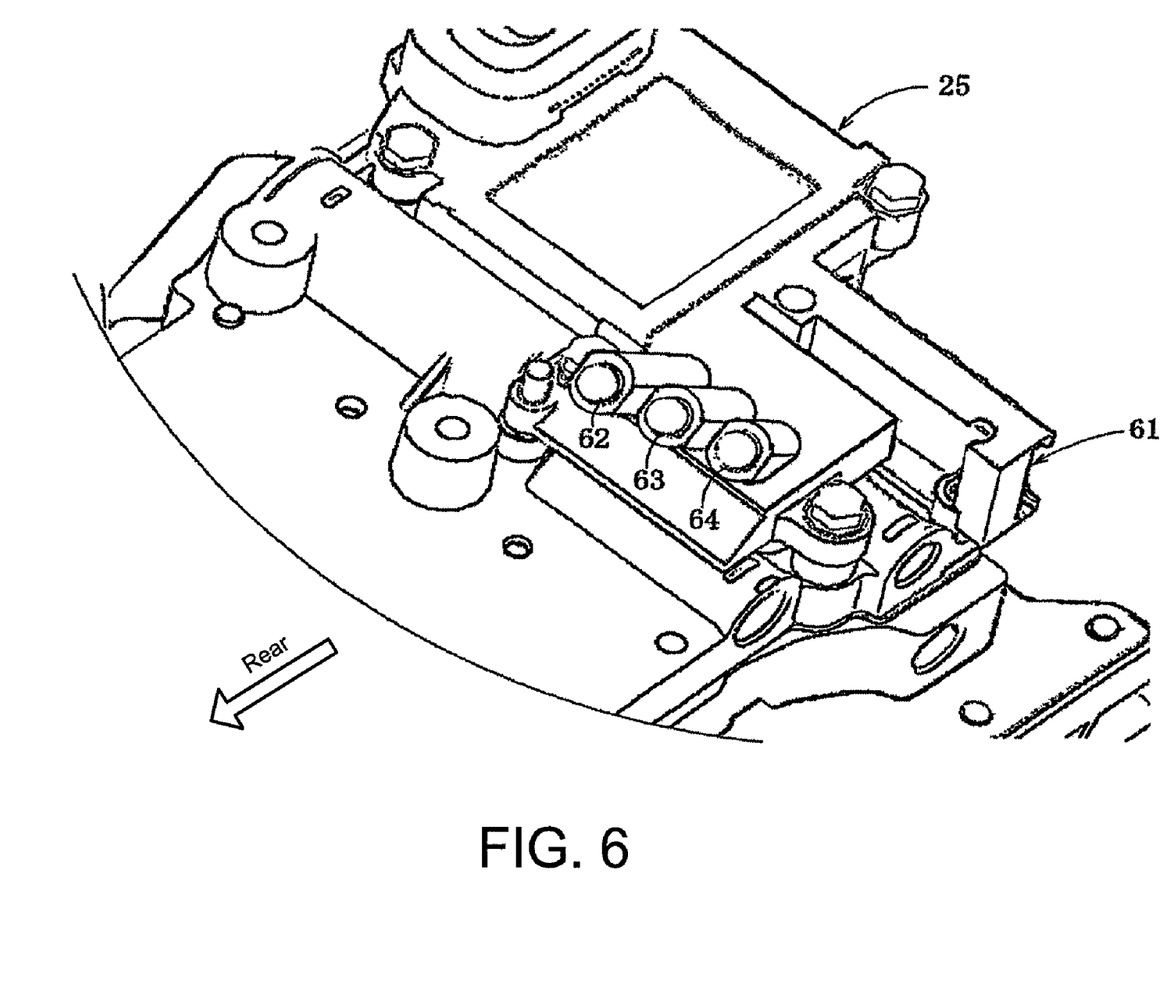
FIG. 6 is a perspective view of the electronic control unit and the rotation sensors.
Figure 7:
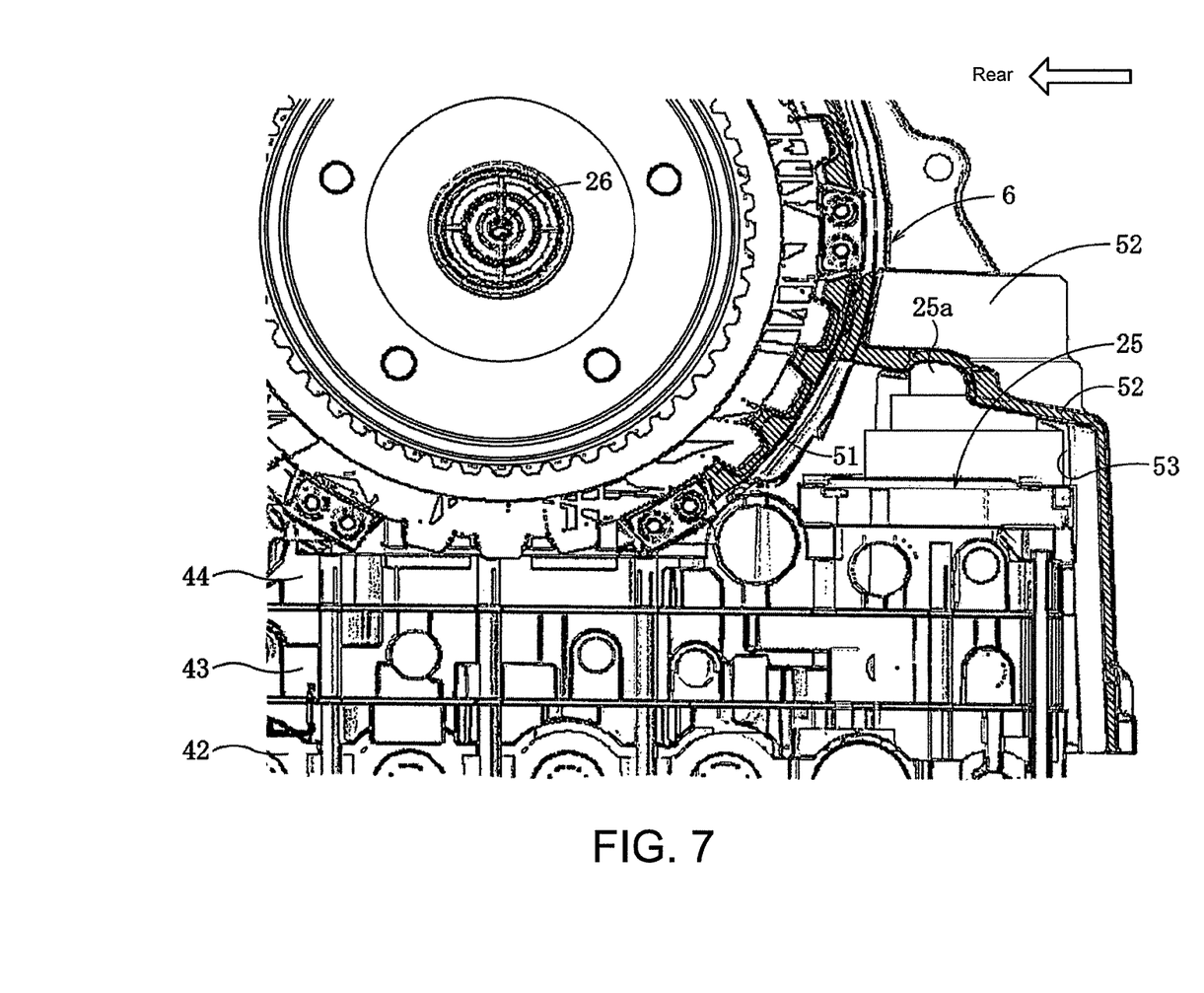
FIG. 7 is a partial cross-sectional view of a containing space in which the electronic control unit is accommodated and its vicinity portion.

As shown in FIGS. 5-7, the transmission case 6 surrounding the gear-shift mechanism 5 includes a peripheral wall 51 along an outer perimeter of the rotating members, such as gears and drums. The peripheral wall 51 is opened downwardly at a lower end, and the transmission case 6 also includes an outer wall 52 integrally extending forward from the peripheral wall 51 to be located adjacent to the peripheral wall 51. A containing space 53 of an upwardly convex shape is formed above the valve body 44, and it contains the peripheral wall 51 of the transmission case 6, the outer wall 52, and the highest valve body 44. The containing space 53 is disposed forward side of the gear-shift mechanism 5, and the electronic control unit 25 is disposed inside the containing space 53.

The electronic control unit 25 has a control unit case made of a synthetic resin, a printed circuit board (not illustrated) accommodated inside the control unit case, and a computer (not illustrated) mounted on the printed circuit board. An integrated connector 25a to which a plurality of signal lines or power lines are connected is integrally provided above and to a left end portion of the electronic control unit 25.

The electronic control unit 25 includes a sensor mounting portion 25A integrally formed therewith so that it continues to the right from the rear and right end portion of the electronic control unit 25. The sensor mounting portion 25A is also integrally formed with a position detecting sensor 61 for detecting a moved position of the manual valve 35, and rotation sensors 62, 63, and 64 for detecting rotation speeds of the rotating members of the gear-shift mechanism 5. The rotation sensors 62, 63, and 64 are integrally formed with the electronic control unit 25. The rotation sensors 62, 63, and 64 are formed so as to be inclined rearward from the electronic control unit 25. The position detecting sensor 61 and the rotation sensors 62, 63, and 64 are connected to the electronic control unit 25 via harnesses.

The position detecting sensor 61 is a potentiometer-type sensor. The position detecting sensor 61 includes a guide portion 61a that is a level, rectangular groove in the left-and-right direction, and a resistance body 61b provided in an intermediate portion of the guide portion 61a. The position detecting sensor 61 also includes a movable member 61c that is movable to the left and right along the guide portion 61a, and an engaging member 61d attached to the movable member 61c for engaging with the disk member 35a of the manual valve 35.

When the manual valve 35 is switched by the operation of the shift lever 360, because the movable member 61c also integrally moves to a position corresponding to the shift position via the engaging member 61d, the moved position may be detected based on the change in a value of electrical resistance.

As shown in FIGS. 1, 5, and 6, the rotation sensor 62 of this embodiment is an electromagnetic pickup sensor that detects a rotation of the input shaft 4 (i.e., turbine shaft). The rotation sensor 63 is an electromagnetic pickup sensor that detects a rotation of the valve member of the first clutch 40 (i.e., rotation of the first and second sun gears 11 and 21). The rotation sensor 64 is an electromagnetic pickup sensor that detects a rotation of the output gear 7. As shown in FIG. 1, the rotation sensors 62, 63, and 64 and the electronic control unit 25 are disposed in this order from the torque converter 3.

Next, operations and effects of the control device of the automatic transmission 1 will be explained.

As described above, the electronic control unit 25 for controlling the gear shift 360 is provided inside the containing space 53 that is formed with the peripheral wall 51 of the transmission case 6, the outer wall 52 of the transmission case 6 is provided adjacent to the peripheral wall 51 and the valve body 44. Further, forward and immediately below the gear-shift mechanism 5, there may be a dead space inside the outer wall 52 of the transmission case 6. The dead space may be effectively used by arranging the electronic control unit 25 at the dead space, which is departed from the gear-shift mechanism 5. Thus, the electronic control unit 25 may be arranged within an internal space of the transmission case 6 and at a position where the electronic control unit 25 will not be damaged by hot oil dispersed from the gear-shift mechanism 5, thereby maintaining the durability of the electronic control unit 25.

The present invention may be applied to a FF-three-shaft-type automatic transmission that includes the primary shaft 26, the secondary shaft 27, and the differential shaft 28 to form the containing space 53 at a position forward side of the gear-shift mechanism 5. Thus, the electronic control unit 25 may be certainly arranged within the containing space 53.

In the above embodiment, because the electronic control unit 25 is arranged on the top portion of the valve body 44, lengths of the plurality of harnesses that connects the electronic control unit 25 with the solenoid 250 of the control valves may be shortened, thereby reducing the manufacturing cost. Further, in the above embodiment, because the rotation sensors 62, 63, and 64 are integrated with the electronic control unit 25, harnesses or couplers for connecting the rotation sensors 62, 63, and 64 with the electronic control unit 25 may also be reduced in number. Further, in the above embodiment, because the rotation sensors 62, 63, and 64 are inclined rearwardly from the electronic control unit 25, the electronic control unit 25 integrated with the rotation sensor may be arranged at a higher position, thereby reducing the damages caused due to the scattered hot oil.

Further, in the above embodiment, because the automatic transmission 1 includes the torque converter 3, and because the rotation sensors 62, 63, and 64 and the electronic control unit 25 are arranged in this order from the torque converter 3, the electronic control unit 25 may be arranged at a position distant from the torque converter 3 that is easy to increase in temperature.

Further, in the above embodiment, the position detecting sensor 61 for detecting the moved position of the manual valve 35 is provided, and the position detecting sensor 61 is integrated with the electronic control unit 25. Thus, the harnesses and couplers connecting the position detecting sensor 61 with the electronic control unit 25 may be reduced in number, thereby arranging the position detecting sensor 61 compactly.

Further, in the above embodiment, the manual valve 35 is disposed in parallel with the primary shaft 26 to move in the axial direction. Thus, it may be possible to compactly arrange the manual valve 35.

Further, in the above embodiment, the manual valve 35 is provided to the highest valve body 44 among the plurality of valve bodies 42, 43, and 44. The electronic control unit 25 is arranged on the top portion of the highest valve body 44. Thus, the electronic control unit 25 may be arranged at a higher position to reduce the thermal damage.

Next, an example in which the above embodiment is partially changed will be explained.

In the above embodiment, the present invention is applied to the automatic transmission of the automobile with a side-mounted engine. It should be appreciated by those skilled in the art that the present invention may also be applied to automatic transmissions other than those of the automobile with the side-mounted engine.

In the above embodiment, the control-valve unit of the automatic transmission is provided with three valve bodies piled in three layers. It should be appreciated by those skilled in the art that the valve bodies may be two instead of three, and may also be one.

In addition, a person skilled in the art may suitably modify the embodiment, and the modified embodiment may also be included in the scope of the present invention.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An automatic transmission comprising:
   a valve body including control valves for hydraulically controlling a friction engaging element provided within said transmission, the transmission having an input shaft;
   an electric control unit located on said valve body for controlling gear shifting of said automatic transmission;
   a transmission case having a peripheral wall for at least partially enclosing a gear shift mechanism along an outer perimeter of a plurality of rotating members of the gear shift mechanism and an outer wall of the transmission case laterally extending downward from said peripheral wall to cover a top side and a side surface of the valve body;
   a containing space provided by said peripheral wall, said outer wall and said valve body and located laterally offset from a location immediately beneath said gear shift mechanism; and
   rotation sensors integrated with the electric control unit for detecting rotation speeds of said plurality of rotating members of said gear shift mechanism, and said rotation sensors of the electric control unit being arranged side by side in an axial direction of the input shaft;
   wherein said electric control unit is located within said containing space, said peripheral wall is formed between said electric control unit and said gear shift mechanism, and said rotation sensors are disposed in positions directly facing the rotating members.

2. The automatic transmission as described in claim 1, further comprising:
   a primary shaft coaxially positioned relative to an engine output shaft and provided in said gear shift mechanism;
   a secondary shaft extending parallel to and located above and behind said primary shaft; and
   a differential axis extending parallel to and located below and behind said primary shaft;
   wherein said valve body is located under said gear shift mechanism, and said containing space is positioned on a forward side of said gear shift mechanism.

3. The automatic transmission as described in claim 2, wherein said rotation sensors are integrated with and extending diagonally from said electric control unit.

4. The automatic transmission as described in claim 3, further comprising a torque convertor,
   wherein said rotation sensors are spatially positioned intermediate said electric control unit and said torque convertor.

5. The automatic transmission as described in claim 3, further comprising:
   a manual valve provided in said valve body and moving in conjunction with a shift range changing operation via a shift lever; and
   a position detecting sensor for detecting a position of said manual valve,
   wherein said position detecting sensor is integrated with said electric control unit.

6. The automatic transmission as described in claim 5, wherein said manual valve is located parallel with said primary shaft and is configured to move in an axial direction of the primary shaft.

7. The automatic transmission as described in claim 6, wherein the valve body is one of a plurality of valve bodies, the automatic transmission further comprising:
   a control valve unit including the plurality of valve bodies stacked in an up and down direction;
   wherein said manual valve is provided in one of the valve bodies located on a top portion of said control valve unit; and
   wherein said electric control unit is located on an upper side of said valve body located on the top portion of said control valve unit.

8. The automatic transmission as described in claim 2, further comprising:
   a manual valve provided in said valve body and moving in conjunction with a shift range changing operation via a shift lever; and
   a position detecting sensor for detecting a position of said manual valve;
   wherein said position detecting sensor is integrated with said electric control unit.

9. The automatic transmission as described in claim 8, wherein said manual valve is located parallel with said primary shaft and is configured to move in an axial direction of the primary shaft.

10. The automatic transmission as described in claim 9, wherein the valve body is one of a plurality of valve bodies, the automatic transmission further comprising:
    a control valve unit including the plurality of valve bodies stacked in an up and down direction;
    wherein said manual valve is provided in one of the valve bodies located on a top portion of said control valve unit; and wherein said electric control unit is located on an upper side of said valve body located on the top portion of said control valve unit.

11. An automatic transmission comprising:
a valve body including control valves for hydraulically controlling a friction engaging element provided within said transmission; and
an electric control unit located on said valve body for controlling gear shifting of said automatic transmission;
a transmission case having a peripheral wall for at least partially enclosing a gear shift mechanism, an outer wall provided adjacent to said peripheral wall, and a containing space surrounded by said peripheral wall, said outer wall and said valve body such that a shape of said containing space is convex upward;
a primary shaft coaxially positioned relative to an engine output shaft and provided in said gear shift mechanism;
a secondary shaft extending parallel to and located above and behind said primary shaft; and
a differential axis extending parallel to and located below and behind said primary shaft;
wherein said electric control unit is located within said containing space;
wherein said valve body is located under said gear shift mechanism, and said containing space is positioned on a forward side of said gear shift mechanism.

12. An automatic transmission comprising:
a transmission case having a peripheral wall for at least partially enclosing a gear shift mechanism along an outer perimeter of a plurality of rotating members of the gear shift mechanism, and an outer wall of said transmission case laterally extending downward from said peripheral wall to cover a top side and a side surface of a valve body associated with the transmission case, the peripheral wall and outer wall of the transmission case being formed to at least partially define, with the valve body, a containing space located laterally offset from a location immediately beneath said gear shift mechanism and sized to contain an electric control unit located on the valve body which includes integrated rotation sensors arranged side by side in an axial direction of an input shaft of the transmission and directly facing said plurality of rotating members of said gear shift mechanism for detecting rotation speeds of the plurality of rotating members.

* * * * *